United States Patent [19]
Karch

[11] 3,724,388
[45] Apr. 3, 1973

[54] APPARATUS FOR ELECTROMAGNETIC SUSPENSION AND GUIDANCE OF TRACKED CARS

[75] Inventor: Ludwig Karch, Munich, Germany

[73] Assignee: Messerschmitt-Bolkow-Blohm Gesellschaft mit beschrankter Haftung, Munich, Germany

[22] Filed: Oct. 1, 1971

[21] Appl. No.: 185,521

[30] Foreign Application Priority Data

Oct. 27, 1970 Germany..................P 20 52 599.9

[52] U.S. Cl..........................104/148 MS, 317/123
[51] Int. Cl. .................................................B61b 13/08
[58] Field of Search .104/148 MS, 148 LM; 317/123; 310/8

[56] References Cited

UNITED STATES PATENTS 3,307,884  3/1967  Dunlap et al..........................308/10
3,569,792  3/1971  Schaffersmann.....................317/123
3,638,093  1/1972  Ross............................104/148 MS

FOREIGN PATENTS OR APPLICATIONS 643,316  4/1937  Germany......................104/148 MS Primary Examiner—Gerald M. Forlenza
Assistant Examiner—George H. Libman
Attorney—Toren and McGeady

[57] ABSTRACT

In the apparatus disclosed current is supplied to electromagnets which suspend and / or guide the cars that travel along tracks in an electromagnetic suspension system. The current is alternately supplied along two mains from a single generator. One main exhibits the voltage rated for the electromagnets of the car and the other a voltage which is higher than the rated voltage by an order of magnitude. The higher voltage main supplies high voltage pulses or shock currents for stabilizing cars which deviate slightly from the normal path along the track in response to transverse winds or other transverse forces.

8 Claims, 6 Drawing Figures

APPARATUS FOR ELECTROMAGNETIC SUSPENSION AND GUIDANCE OF TRACKED CARS

BACKGROUND OF THE INVENTION

This invention relates to cars such as railway cars which are magnetically supported and / or guided relative to a track, and particularly to electrical equipment for holding the magnetically suspended vehicles along the track.

In such cars or vehicles electromagnets of high supporting capacity suspend and guide the cars relative to a track or track arrangement. Exact maintenance of the distance between the cars and the track arrangement is necessary, and rendered possible by controlling the excitation of these electromagnets. Rapid load changes, particularly those resulting from sudden strong air blasts on cars moving at high speed, can be compensated for by exciting the electromagnets momentarily with sudden pulses or in a manner similar to a shock excitation. This requires applying short term voltages of very high values. These adverse forces that disturb the normal forward travel of the cars may appear at any time and with varying intensities. Since these times and intensities cannot be determined in advance, the compensating current supply for the electromagnets must be such that a particularly high voltage is always available.

Because of the above, known magnetic suspension systems for high-speed trains employ such a high voltage as the operating voltage for the electromagnets. Depending upon the layout of the electromagnets, the voltage can be 10 to 15 times higher than the rated or operating voltage of the electromagnets. If a generator is to supply the sum of the rated currents of all the electromagnets at this high voltage, it must be capable of delivering a correspondingly high rated power. Such a generator is thus very heavy. This means that the cars carry heavy, poorly utilized generators. This disadvantage also applies when the electric power is fed from a stationary power system, because at least one emergency generator must be available in the car when this current supply fails.

An object of this invention is to improve such apparatus.

Another object of the invention is to avoid such heavy generators for electromagnets in the cars of a track-bound train suspended and / or guided by them. The track-bound train should be understood as any land vehicle whose track or path is fixed.

SUMMARY OF THE INVENTION

According to a feature of the invention these objects are attained and the disadvantages overcome, by feeding electric power selectively from at least two supply mains or supply networks of different voltages.

According to another feature of the invention, the mains are fed from a central main or network whose rated voltage is higher than that of the electromagnets by about an order of magnitude. One of the two mains fed from the central main receives its energy over a transformer. The term "main" is used herein in the singular to mean an electrical supply network, including all the conductors carrying the current.

According to another feature of the invention, the rated voltage of the central main is lower than the rated voltage of the operating main on the secondary side of the transformer.

In any case, however, a voltage is provided which is one order of magnitude higher than the rated voltage of one of the operating mains and serves as a supplemental voltage, not the operating voltage, for the electromagnets. The rated voltage of the other operating main is lower.

According to another feature of the invention, the high voltage main is controlled so that the electromagnets are fed briefly and only when air blasts or other sudden outside thrusts act on the vehicles. As long as no force changes or only minor force changes are required, the power is fed from the low voltage main whose rated voltage corresponds to the operating voltage of the electromagnets.

With such a current supply, a primary generator feeding the central main need substantially be powered only for the sum of the rated powers of all electromagnets arranged on the car or train. When the electric power is fed from the high voltage main the primary generator is overloaded. However, the overload is of extremely short duration and thus without significance. The additional electric power delivered by the generator is only higher by a small percentage than the sum of the rated powers of all electromagnets. As a rule, all electromagnets of the cars do not require supplemental energy at the same time to compensate for air blasts. Rather they are energized in succession because the air blasts move along a train of cars with the speed at which the cars move forward.

In view of this fact, and according to another feature of the invention, the additional electric power is obtained from electromagnets which have to be energized briefly, if necessary, without having to be energized more first.

These and other features of the invention are pointed out in the claims. Other objects and advantages of the invention will become obvious from the following detailed description when read in light of the accompanying drawings.

DETAILED DESCRIPTION OF PREFERRED EMBODIMENTS

Figure 1:
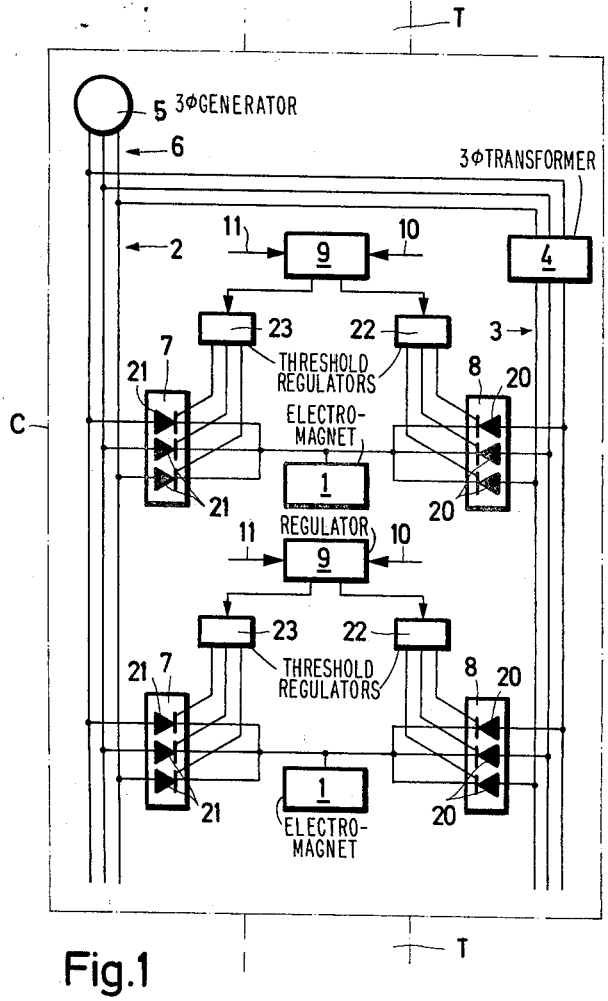
FIG. 1 shows a block diagram of a current supply for electromagnets which serve as supporting or guide magnets in cars of a suspension railway.
Figure 2:
FIG. 2 shows a gap feeler.
Figure 3:
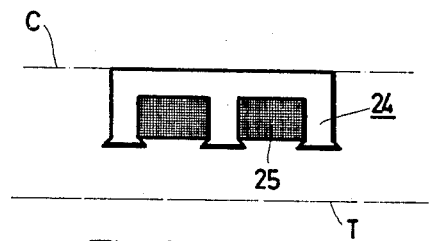
FIG. 3 shows an acceleration transmitter.
Figure 4:
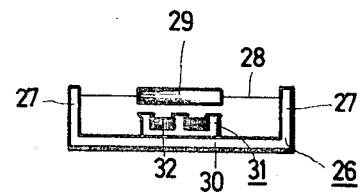
FIG. 4 shows a current gate arrangement.

Referring to the drawings, in particular, the invention embodied therein in FIGS. 1 to 5, electromagnets 1 are mounted on a car C. The electromagnets suspend and guide the car C along a track T. Each electromagnet 1 includes its exciter or energizing coil.

Feeding of electric power to the electromagnets 1 is effected selectively from two operating mains 2 and 3 of different voltage. A single three-phase generator 5 energizes the main 2 directly and the other main 3 over a threeephase transformer 4 from a central main 6. Electromagnets 1 are connected to the mains 2 and 3 over current gate arrangements 7 and 8. These current gate arrangements may, for example, be composed each of three thyristors 20, 21, which, as is known, are each actuated by a so-called threshold regulator 22, respectively 23; the latter determine the trigger point of the thyristors 20, respectively 21 depending on the respective input voltage of the regulators 22, 23. Regulator 9, connected with both threshold regulators 22 and 23, ensures that at one time only one current gate arrangement is conductive while the other is blocked. This regulator 9 is a known analog computer which actuates at a certain threshold value of its output voltage either the threshold regulator 22 or the threshold regulator 23 in the customary way, employing a voltage-sensitive commutator (not shown), for instance a Zener diode. It should be noted that additional electromagnets are connected in the same manner to the mains 2 and 3.

The generator 5 has a rated voltage which is higher than the rated voltage of the electromagnets 1 by at least one order of magnitude. Its rated power corresponds approximately to the sum of the rated powers of all electromagnets arranged on one or several cars. Transformer 4 is arranged so that it reduces the rated voltage of generator 5 to an operating voltage which corresponds approximately to the three- to four-fold rated voltage of the electromagnets 1. This higher operating voltage is necessary so that, when all electromagnets are fed from the main 3 connected to the delivery side of the transformer 4, the position of the cars with respect to the track arrangement, for example, because of inaccurate track position, can be corrected by varying the exciter current. To this end a measuring quantity designated by the arrow 10, originating, for example, from known gap feelers, is fed in known manner to the respective regulator 9. For instance, each gap feeler is a small electromagnet 24 (FIG. 2) arranged on the base of the car C, whose coil 25 is connected with the regulator 9 (FIG. 1) at 10. The electromagnet 24, whose inductivity depends on the distance, for instance, to a magnetically conductive rail (not shown) of track T, supplies the measuring quantity 10, depending on the respective distance to this rail, which determines the trigger point of the thyristors 20.

The start of the current gates 20 and the feeding of electric power from the associated main 3 is effected as long as no outside interfering forces act on the car. When a sudden air blast strikes the car or part of the car laterally, it produces a lateral shock. An acceleration transmitter located in the car or the part of the car thus shocked, produces a measuring quantity along the arrow 11. This quantity constrains the regulator 9 to turn off the current gate arrangement 8 and turn on the current gate arrangement 7. As illustrated, for instance, in FIG. 3, the acceleration transmitter comprises a clamp 26 with a metal weight 29 held between its jaws 27 by a spring 28; a small electromagnet 31 is attached to the cross-bar 30 of the clamp 26, whose coil 32 is connected with the regulator 9 (FIG. 1) at 11. If the distance between the weight 29 and the electromagnet 31 alters due to a sudden blast striking the car or the respective part of the car laterally, the electromagnet then supplies the regulator 9 with a corresponding measuring quantity 11. Naturally, each of the electromagnets 1 is assigned an acceleration transmitter which can be secured to the assigned electromagnet.

As a result of turning off the current gate arrangements 8 and turning on the current gate arrangements 7, the electric power fed from the low voltage main 3 to the electromagnets 1 is cut off while the power fed from the main 2 to the electromagnets 1 is turned on. This power derives directly from the high voltage generator 5 through the central main 6. The new voltage is applied briefly in the form of a sudden pulse similar to a shock excitation. The suddenly applied high voltage from the generator 5 has the effect of forcing a heavier exciter current to flow through the electromagnets 1 with only a minor delay. Damage to the generator 5 does not occur because the heavier current is required only for an extremely short time. It is also not required at the same time for all electromagnets of a car or train. The air blast moves along the cars so as to affect the acceleration transmitters successively along the car or cars. Thus, the electromagnets are connected successively to the main 2 to receive their high voltage pulses.

It should be understood that according to an embodiment of the invention the car C is one of a number of cars forming a train. As the train passes a particular point the air blast at that point strikes the cars successively. Thus, the reactions by the electromagnets need merely be successive.

Some additional electromagnets can be used for relieving generator 5. This applies both to electromagnets which have already been energized to a higher level and which must be de-energized to some extent, and to electromagnets which must be completely de-energized if necessary and which are arranged on the sides of the cars remote from the action of the force. To this end the cars or the train, according to another embodiment of the invention, are provided with additional current gates, in the form of thyristors, which transmit current in a direction opposite to that of the main 2. For this purpose, for example, only the current gate arrangements 7 (FIG. 1) may each be replaced by the arrangement shown in FIG. 4 whereby a thyristor 34 is assigned to each thyristor 21, the former allowing passage of current in the opposite direction. Regulator 23 also actuates these thyristors 34.

Figure 5:
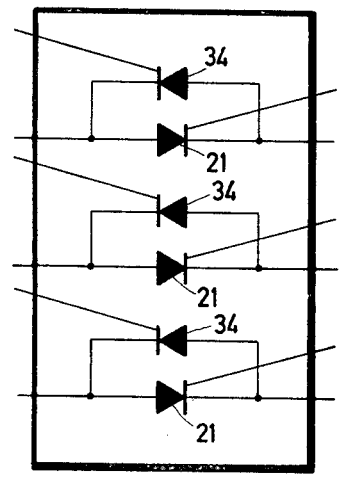

According to these embodiments of the invention, there is a clear requirement for the dimensioning of the generator 5. A car such as C can, therefore, be equipped with lighter and better utilized generators than was heretofore possible. This is also important on cars or trains whose electromagnets are energized from stationary mains. Such cars, as mentioned above, require an additional emergency current supply. Apart from that, the frequency of the mains is usually so low that the current supply is preferably effected only over frequency transformers in order to avoid delays in the control of the excitation of the electromagnets. According to the invention weight is thus saved in these frequency transformers. In this case, for instance, generator 5 need only be coupled mechanically with an electromotor 35 (FIG. 5). The electromotor 35, for example an single-phase A.C. motor, is fed in a known manner via a sliding contact 36 by a fixed main 37, whose frequency is lower than that of the central main 6 of the car C.

According to another embodiment of the invention, generators with lower rated voltages are used. The transformer 4 should then be arranged between the central main 6 and the main 2 (not shown). In this case the transformer constitutes a step-up transformer. Additional disconnectible loads, such as lighting or heating systems can be connected, where necessary, to the mains 2 and 3.

Figure 6:
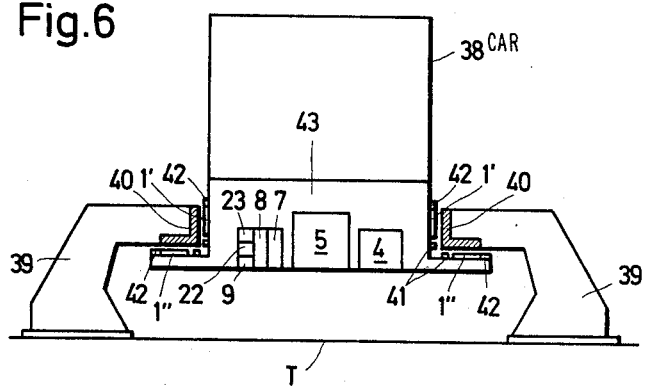
FIG. 5 is a diagram for a current supply of another embodiment of the invention and FIG. 6 shows a car section as well as a configuration for the magnetic suspension and guidance of the same.

It should also be noted that the above-described electromagnets 1 can act on magnetically conductive rails of track T. As illustrated in FIG. 6, for instance, electromagnets 1' can be arranged vertically as guidance magnets along a car or train 38 to maintain the car or train between two rails 40 connected via rail supports 39 with track T in midposition. Further electromagnets 1" functioning solely as supporting magnets are arranged horizontally on each side of the car; these suspend the car or train with respect to rails 40, respectively track T. Each of these electromagnets (supporting as well as guidance magnets) is assigned one gap feeler 41 as well as one acceleration transmitter 42 each, whereby the latter is attached to the assigned electromagnet 1' or 1", respectively. The electromagnets as well as the gap feelers and acceleration transmitters are thus located outside the car; as against this, the above-described generator 5, transformer 4 and the current gate arrangements 7 and 8 together with the regulators 9, 22 and 23 as well as the mains 2, 3, 6 (not shown) are arranged in the car, and should most expediently be located in a separate area 43.

While embodiments of the invention have been described in detail, it will be obvious to those skilled in the art that the invention may be embodied otherwise without departing from its spirit and scope.

What is claimed is:

1. An apparatus for a magnetic suspension car, comprising electromagnet means for supporting and/or guiding the car, first main means for carrying electrical current of one voltage, second main means for carrying current at a voltage higher than that of the first main means, and control means for coupling the electromagnet means to said first main means to suspend the car and responsive to external thrusts for momentarily coupling said second main means to the electromagnet means to counter-act the effects of the thrusts on the car.

2. An apparatus as in claim 1, further comprising a central main for energizing said first main means and said second main means.

3. An apparatus as in claim 2, further comprising transformer means connecting said central main to said first main means.

4. An apparatus as in claim 1, wherein the voltage carried by said second main means is higher than the rated voltage of said electromagnet means by one order of magnitude.

5. An apparatus as in claim 2, wherein the voltage of said central main is lower than the voltage carried by at least one of said main means.

6. An apparatus as in claim 1, further comprising generator means located in the car for energizing said first main means and said second main means.

7. An apparatus as in claim 2, further comprising generator means for energizing said central main.

8. An apparatus as in claim 1, wherein said electromagnet means includes a plurality of electromagnets which are energized by said main means, and further comprising means for transferring electric power from an electromagnet that has been energized to an electromagnet that requires energization.

* * * * *